No. 695,833. Patented Mar. 18, 1902.
E. S. PERKINS.
TRUCK.
(Application filed June 27, 1900.)
(No Model.)
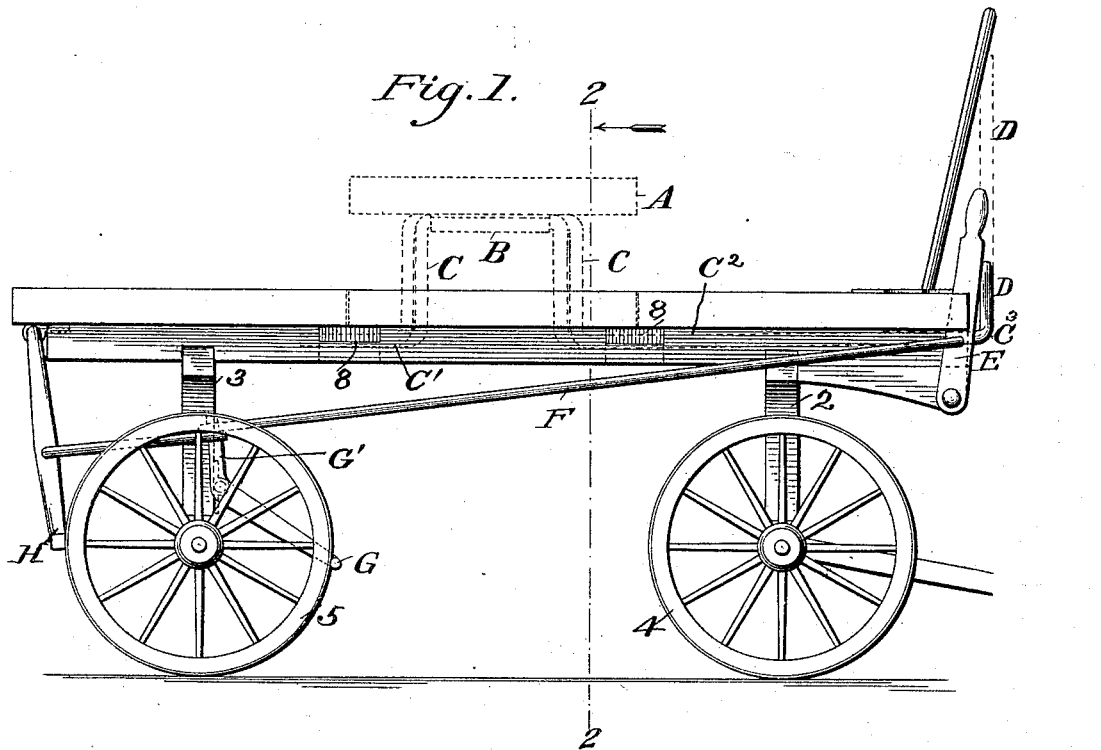
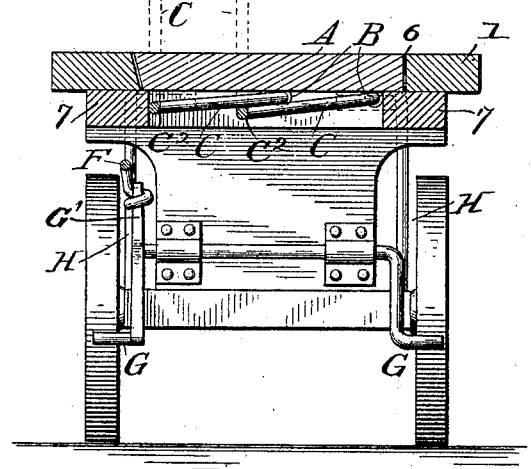
Witnesses,
S. T. Shirley.
W. N. Crewdson
Inventor,
Enoch S. Perkins
THE NORRIS PETERS CO., PHOTO-LITHO., WASHINGTON, D. C.

UNITED STATES PATENT OFFICE.

ENOCH S. PERKINS, OF SIMPSON COUNTY, KENTUCKY.

TRUCK.

SPECIFICATION forming part of Letters Patent No. 695,833, dated March 18, 1902.

Application filed June 27, 1900. Serial No. 21,800. (No model.)

*To all whom it may concern:*

Be it known that I, ENOCH SIMEON PERKINS, a citizen of the United States, residing in Simpson county, Kentucky, (whose post-office address is Auburn, Logan county, Kentucky,) have made certain new and useful Improvements in Trucks, of which the following is a specification.

My invention is an improvement in trucks; and it consists in certain novel constructions and combination of parts, as will be hereinafter described and claimed.

In the drawings, Figure 1 is a side elevation, and Fig. 2 a cross-sectional view on about line 2 2 of Fig. 1, of a truck embodying my invention.

The truck is formed with a bed 1, mounted by means of elevating supports 2 and 3 on the wheels 4 and 5. The bed 1 has a section A, which is detached from the body of the bed and fits when lowered in an opening 6 in the said body, as shown in Fig. 2, and can be raised to the position indicated in dotted lines in Figs. 1 and 2 by the devices presently described. When lowered to the position shown in Fig. 2, the section A rests at its opposite edges upon side bars 7, which extend beneath the bed 1 and serve to brace the bed and to support the movable section A when the same is lowered, as shown in Fig. 2. This section A may be raised to receive or deliver goods at different heights, this being desirable in the use of the truck as a baggage or freight truck in connection with railroads or in commercial houses or any other places where it may be found convenient. By preference the section A is raised and lowered by the crank-frames C, carried by the shaft-sections C' and C², journaled in suitable bearings beneath the bed 1, and preferably in cross-bars 8, which extend beneath the said bed, as will be understood from Figs. 1 and 2. The crank-frames C have their wrists B journaled to and beneath the section A, so they will support and adjust the said section in its different positions. One of the shaft-sections C² is extended, as shown at C³, and is provided with a handle-lever D, (see Fig. 1,) by which it may be operated. It will be noticed that as the lever D is thrown from the full-line position shown in Fig. 1 to the dotted-line position indicated in the same figure the section A of the truck-bed will be raised to the position indicated in dotted lines in Fig. 1. In operation the section A may be adjusted to such position in delivering goods from the truck or receiving goods on the truck, the section A operating as an elevator in both instances. It may be desirable to provide a rack or other detent mechanism by which to hold the lever D in any position to which it may be adjusted, so the section A can be held in any vertical adjustment.

To prevent any movement of the truck, I provide a brake operating upon the rear wheels 5 and consisting of brake-levers G and H, having their shoes arranged to operate, respectively, on the front and rear sides of the wheel, the opposite brake-levers of each pair being connected together, and the lever G, having an extension G', to which is connected the brake-rod F, which rod is also connected with one of the brake-levers H, so the movement of the brake-rod F by the lever E will operate to set both brakes, as will be understood from Fig. 1 of the drawings. A suitable rack or other detent may be arranged for engagement by the lever E to hold said lever in any desired adjustment.

The lever may be attached at each end of the platform-section A when it is designed to be used for heavy weights, so that it can be operated by two men.

Having thus described my invention, what I claim, and desire to secure by Letters Patent, is—

A truck comprising the bed or platform provided with an opening, a platform-section movable vertically into and out of said section, and crank-frames journaled to the bed or platform on axes extending in the direction of length of the bed or platform, and having their wrists connected with the movable platform, substantially as set forth.

ENOCH S. PERKINS.

Witnesses:
S. T. SHIRLEY,
W. L. PERKINS.